United States Patent
Bhatt et al.

(10) Patent No.: US 8,797,897 B1
(45) Date of Patent: Aug. 5, 2014

(54) METHODS AND APPARATUS WITH VIRTUAL IDENTIFIERS FOR PHYSICAL SWITCHES IN A VIRTUAL CHASSIS

(75) Inventors: Megh Bhatt, Dublin, CA (US); Harshad Nakil, Santa Jose, CA (US); Rajashekar Reddy, Santa Jose, CA (US); Saurabh Agarwal, Fremont, CA (US); Shankar Ramanathan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 178 days.

(21) Appl. No.: 13/249,963

(22) Filed: Sep. 30, 2011
(Under 37 CFR 1.47)

(51) Int. Cl.
H04L 12/26 (2006.01)
H04Q 11/00 (2006.01)

(52) U.S. Cl.
CPC .............. *H04L 12/26* (2013.01); *H04Q 11/00* (2013.01)
USPC ........... 370/252; 370/386; 370/398; 370/399; 709/232; 709/235

(58) Field of Classification Search
USPC ................. 370/252, 301, 398–399, 386–392; 709/232–235
See application file for complete search history.

(56) References Cited

U.S. PATENT DOCUMENTS

| | | | |
|---|---|---|---|
| 6,252,878 B1 | 6/2001 | Locklear, Jr. et al. | |
| 6,976,103 B1 | 12/2005 | Watanabe et al. | |
| 7,362,702 B2 | 4/2008 | Terrell et al. | |
| 7,447,197 B2 | 11/2008 | Terrell et al. | |
| 8,190,769 B1 | 5/2012 | Shukla et al. | |
| 2001/0053149 A1 | 12/2001 | Mo et al. | |
| 2008/0159277 A1 | 7/2008 | Vobbilisetty et al. | |
| 2010/0061391 A1 | 3/2010 | Sindhu et al. | |
| 2010/0085981 A1 | 4/2010 | Gupta et al. | |
| 2010/0278076 A1 | 11/2010 | Reddy et al. | |
| 2011/0286342 A1* | 11/2011 | Ee et al. ........................ | 370/252 |
| 2011/0299525 A1 | 12/2011 | Peterson | |
| 2012/0230182 A1 | 9/2012 | Southworth et al. | |

* cited by examiner

*Primary Examiner* — Charles C Jiang
*Assistant Examiner* — Mohamed Kamara
(74) *Attorney, Agent, or Firm* — Cooley LLP

(57) ABSTRACT

In some embodiments, an apparatus includes a first switch having an egress port configured to be coupled to a second switch to collectively to define a single logical entity having a set of virtual identifiers. A first set of virtual identifiers from the set of virtual identifiers is associated with the first switch, a second set of virtual identifiers from the set of virtual identifiers is associated with the second switch. The first switch is configured to receive a forwarding table associating a first set of destination addresses with a set of identifiers local to the first switch and associating a second set of destination addresses with a set of identifiers local to the second switch. Each identifier from the first set of identifiers is uniquely associated the first set of virtual identifiers. Each identifier from the set of identifiers is uniquely associated the second set of virtual identifiers.

20 Claims, 7 Drawing Sheets

Forwarding State Table 600

| Virtual ID 610 | FE ID / Port ID 620 | Connection 630 | Address 640 |
|---|---|---|---|
| 0 | 0/0 | Device A | 01:23:45:67:89:ab |
| 23 | 7/2 | Device B | 11:22:33:44:55:66 |
| 55 | 18/1 | Device C | 11:00:ab:ab:12:34 |
| 191 | 63/2 | Switch 120 | Switch 120 |
| 192 | 0/0 | Switch 110 | Switch 110 |
| 270 | 26/0 | Device D | 00:12:33:44:55:66 |
| 271 | 26/1 | Device E | 00:11:22:33:44:55 |
| 383 | 63/2 | Switch 130 | Switch 130 |
| 384 | 0/0 | Switch 120 | Switch 120 |
| 386 | 0/2 | Device F | aa:bb:cc:dd:ee:ff |
| 411 | 9/0 | Device G | 01:00:01:00:01:00 |
| 574 | 63/1 | Device H | 00:01:02:03:04:05 |

Forwarding State Table 600

| Virtual ID 610 | FE ID / Port ID 620 | Connection 630 | Address 640 |
|---|---|---|---|
| 0 | 0/0 | Device A | 01:23:45:67:89:ab |
| 23 | 7/2 | Device B | 11:22:33:44:55:66 |
| 55 | 18/1 | Device C | 11:00:ab:ab:12:34 |
| 191 | 63/2 | Switch 120 | Switch 120 |
| 192 | 0/0 | Switch 110 | Switch 110 |
| 270 | 26/0 | Device D | 00:12:33:44:55:66 |
| 271 | 26/1 | Device E | 00:11:22:33:44:55 |
| 383 | 63/2 | Switch 130 | Switch 130 |
| 384 | 0/0 | Switch 120 | Switch 120 |
| 386 | 0/2 | Device F | aa:bb:cc:dd:ee:ff |
| 411 | 9/0 | Device G | 01:00:01:00:01:00 |
| 574 | 63/1 | Device H | 00:01:02:03:04:05 |

FIG. 6

Virtual ID Table 500

| Switch ID 510 | FE ID / Port ID 512 | Virtual ID 514 |
|---|---|---|
| 110 | 0/0 | 0 |
| 110 | 0/1 | 1 |
| 110 | 0/2 | 2 |
| 110 | 1/0 | 3 |
| ... | ... | ... |
| 110 | 63/2 | 191 |
| 120 | 0/0 | 192 |
| 120 | 0/1 | 193 |
| 120 | 0/2 | 194 |
| 120 | 1/0 | 195 |
| ... | ... | ... |
| 120 | 63/2 | 383 |
| 130 | 0/0 | 384 |
| 130 | 0/1 | 385 |
| 130 | 0/2 | 386 |
| 130 | 1/0 | 387 |
| ... | ... | ... |
| 130 | 63/2 | 575 |

FIG. 5

Forwarding Table 700

| MAC Address 710 | FE ID / Port ID 720 |
|---|---|
| 01:23:45:67:89:ab | 0/0 |
| 11:22:33:44:55:66 | 7/2 |
| 11:00:ab:ab:12:34 | 18/1 |
| 00:12:33:44:55:66 | 63/2 |
| 00:11:22:33:44:55 | 63/2 |
| aa:bb:cc:dd:ee:ff | 63/2 |
| 01:00:01:00:01:00 | 63/2 |
| 00:01:02:03:04:05 | 63/2 |

FIG. 7

Forwarding Table 800

| MAC Address 810 | FE ID / Port ID 820 |
|---|---|
| 01:23:45:67:89:ab | 0/0 |
| 11:22:33:44:55:66 | 0/0 |
| 11:00:ab:ab:12:34 | 0/0 |
| 00:12:33:44:55:66 | 26/0 |
| 00:11:22:33:44:55 | 26/1 |
| aa:bb:cc:dd:ee:ff | 63/2 |
| 01:00:01:00:01:00 | 63/2 |
| 00:01:02:03:04:05 | 63/2 |

FIG. 8

Forwarding Table 900

| MAC Address 910 | FE ID / Port ID 920 |
|---|---|
| 01:23:45:67:89:ab | 0/0 |
| 11:22:33:44:55:66 | 0/0 |
| 11:00:ab:ab:12:34 | 0/0 |
| 00:12:33:44:55:66 | 0/0 |
| 00:11:22:33:44:55 | 0/2 |
| aa:bb:cc:dd:ee:ff | 9/0 |
| 01:00:01:00:01:00 | 63/1 |
| 00:01:02:03:04:05 | |

FIG. 9

METHODS AND APPARATUS WITH VIRTUAL IDENTIFIERS FOR PHYSICAL SWITCHES IN A VIRTUAL CHASSIS

BACKGROUND

Some embodiments described herein relate generally to virtual chassis, and, in particular, to methods and apparatus for increasing number of physical switches in a virtual chassis.

A virtual chassis allows two or more physical switches to interconnect with each other to form a unified single high bandwidth switch representing a single network element. Each physical switch includes one or more packet forwarding engines (PFEs) that are configured to perform traffic forwarding across the physical switches. Some known virtual chassis use a link-state routing protocol to decide a shortest cost path between a pair of PFEs across physical switches. In such virtual chassis, a global address is assigned to each PFE in the multiple physical switches. Thus, the number of PFEs and physical switches that can be included in a virtual chassis is limited by the number of bits in the global address assigned to a PFE.

Accordingly, a need exists for a virtual chassis that can support more number of PFEs than that can be globally addressed.

SUMMARY

In some embodiments, an apparatus includes a first switch. The first switch has an egress port configured to be coupled to a second switch to collectively to define a single logical entity having a set of virtual identifiers. A first set of virtual identifiers from the set of virtual identifiers is associated with the first switch, a second set of virtual identifiers from the set of virtual identifiers is associated with the second switch. The first switch is configured to receive a forwarding state table associating a first set of destination addresses with a set of identifiers local to the first switch, and associated a second set of destination addresses with a set of identifiers local to the second switch. Each identifier from the set of identifiers local to the first switch is uniquely associated the first set of virtual identifiers. Each identifier from the set of identifiers local to the second switch is uniquely associated the second set of virtual identifiers.

BRIEF DESCRIPTION OF THE DRAWINGS

FIG. 5 is a schematic illustration of a virtual ID table, which associates switch identifiers, local identifiers and virtual identifiers of a logical entity, according to an embodiment.

FIG. 6 is a schematic illustration of a forwarding state table, which associates virtual identifiers, local identifiers, connections and addresses, according to an embodiment.

FIG. 7 is a first schematic illustration of a forwarding table, which associates MAC addresses and local identifiers, according to an embodiment.

FIG. 8 is a second schematic illustration of a forwarding table, which associates MAC addresses and local identifiers, according to an embodiment.

FIG. 9 is a third schematic illustration of a forwarding table, which associates MAC addresses and local identifiers, according to an embodiment.

DETAILED DESCRIPTION

Figure 1:
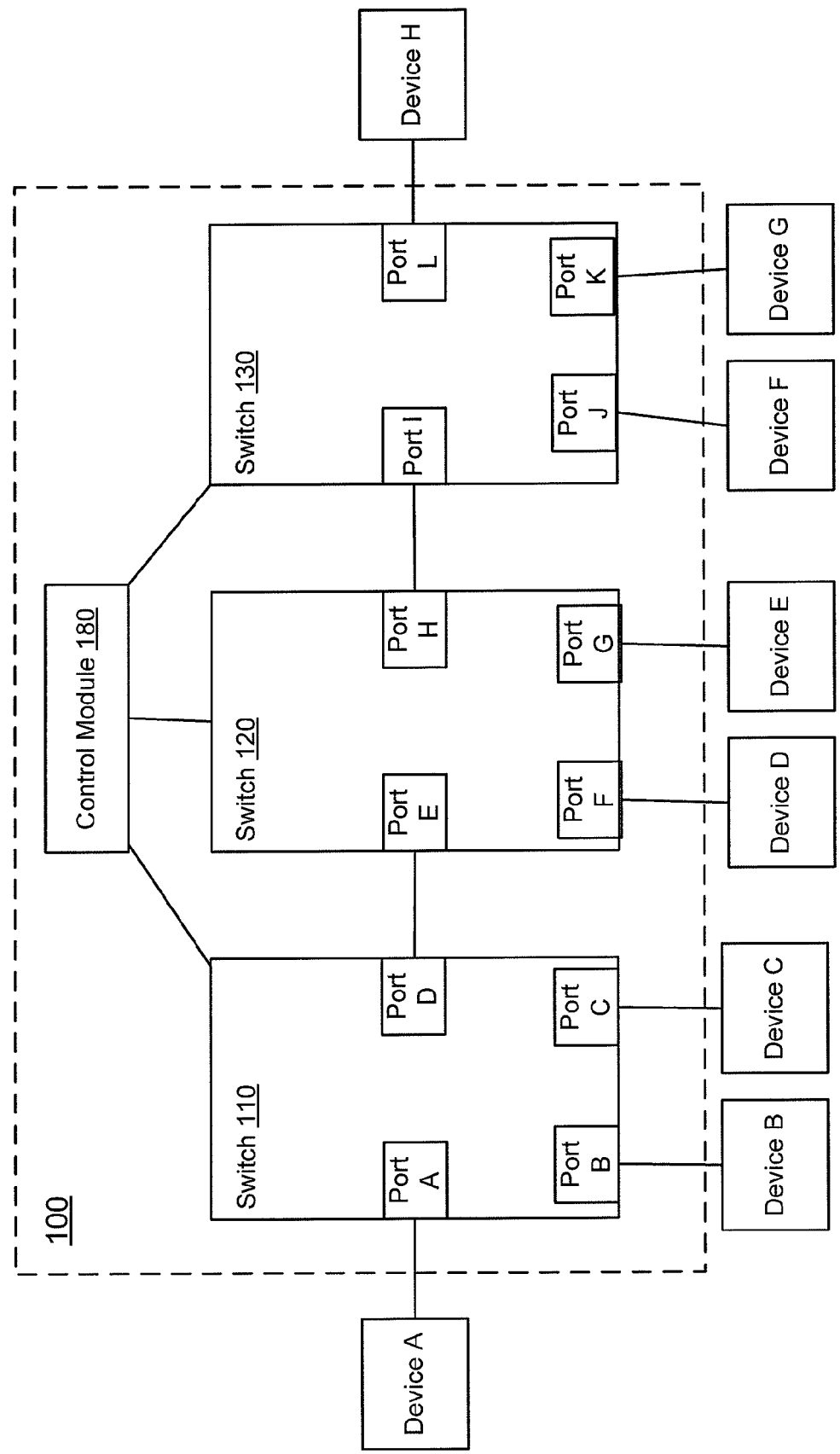
FIG. 1 is a system block diagram of three switches configured to collectively define a single logical entity, according to an embodiment.

In some embodiments, an apparatus includes a first switch having a first egress port and a second egress port. The first egress port is configured to be coupled to a second switch to collectively define a single logical entity that has a group of virtual identifiers. A first set of virtual identifiers from the group of virtual identifiers is associated with the first switch, and a second set of virtual identifiers from the group of virtual identifiers is associated with the second switch. Furthermore, the first switch is configured to receive from a control module a forwarding table that associates a first set of destination addresses with a set of identifiers local to the first switch and that associates a second set of destination addresses with a set of identifiers local to the second switch. The control module defines the forwarding table based on a table that (1) uniquely associates each virtual identifier from the first set of virtual identifiers with an identifier from the set of identifiers local to the first switch, and (2) uniquely associates each virtual identifier from the second set of virtual identifiers with an identifier from the set of identifiers local to the second switch.

In some embodiments, the first switch is configured to receive a packet having a destination address associated with a device operatively coupled to the second switch. The first switch is configured to forward the packet to the second switch via the first egress port based on the identifier within the forwarding table associated with the destination address. In some embodiments, the first switch is configured to receive a packet having a destination address associated with a device operatively coupled to the second egress port of the first switch. The first switch is configured to send the packet to the device via the second egress port based on a identifier within the forwarding table associated with the destination address and associated with the first set of virtual identifiers.

In some embodiments, the first switch is configured to be operatively coupled to a third switch such that the first switch, the second switch and the third switch collectively define the single logical entity. A third set of virtual identifiers from the group of virtual identifiers is associated with the third switch. Each identifier from the set of identifiers local to the third switch is uniquely associated with a virtual identifier from the third set of virtual identifiers. Furthermore, the first switch is configured to receive a packet having a destination address associated with a device operatively coupled to the third switch. The first switch is configured to forward the packet to the third switch via the first egress port based on the first identifier within the forwarding table.

In some embodiments, an apparatus includes a control module. The control module is configured to be operatively coupled to a first switch and a second switch that collectively define a single logical entity having a group of virtual identifiers. A first set of virtual identifies from the group of virtual identifiers is associated with the first switch, and a second set of virtual identifies from the group of virtual identifiers is associated with the second switch. Furthermore, the control module is configured to send to the first switch a forwarding table associating a first set of destination addresses and a set of identifiers local to the first switch. Each identifier from the set of identifiers local to the first switch is uniquely associated with the first set of virtual identifiers. Additionally, the forwarding table associates a second plurality of destination addresses with an identifier from the set of identifiers local to the second switch. In some embodiments, the control module is configured to define the forwarding table based on a table (1) uniquely associating each virtual identifier from the first set of virtual identifiers with an identifier from the set of identifiers local to the first switch, and (2) uniquely associating each virtual identifier from the second set of virtual identifiers with an identifier from a set of identifiers local to the second switch.

In some embodiments, the control module is configured to be operatively coupled to a third switch such that the first switch, the second switch and the third switch collectively define the single logical entity having the group of virtual identifiers. A third set of virtual identifiers from the group of virtual identifiers is associated with the third switch. Each identifier from the set of identifiers local to the third switch is uniquely associated with a virtual identifier from the third set of virtual identifiers.

FIG. 1 is a system block diagram of three switches 110, 120 and 130 configured to collectively define a single logical entity 100, according to an embodiment. Each switch 110, 120, or 130 has one or more ports (e.g., port A-L) that can be coupled to a peripheral device (e.g., device A-H), a port of another switch or a port of any other switching or routing device (not shown in FIG. 1). As shown in FIG. 1, port D of switch 110 is coupled to port E of switch 120; port H of switch 120 is coupled to port I of switch 130. Thus, switches 110, 120 and 130 are operatively coupled to each other. That is, each switch 110, 120 or 130 can send packets to or receive packets from any of the remaining switches 110, 120, 130. Furthermore, switches 110, 120 and 130 are all coupled to a control module 180. As further described herein, some of the operations of switches 110, 120 and 130 can be controlled or manipulated by control module 180. Switches 110, 120, 130 and control module 180 are included in the logical entity 100. In some embodiments, such a logical entity that includes multiple switches can be referred to as a virtual chassis. In a virtual chassis, two or more physical switches can be interconnected with each other to form, for example, a unified single high bandwidth switch representing a single network element.

A switch in the logical entity 100 can be any switching device that can redirect data (e.g., data packets) as it flows through the switch. For example, switch 110, 120 or 130 can be a packet switch, a frame switch, an integrated Ethernet switch, or a cell switch, etc. In some embodiments, each switch 110, 120 or 130 includes multiple ingress ports operatively coupled to write interfaces on a memory buffer (not shown in FIG. 1). Similarly, a set of egress ports (e.g., ports A-L) are operatively coupled to read interfaces on the memory buffer. In some embodiments, the memory buffer can be a shared memory buffer implemented using on-chip static random access memory (SRAM) to provide sufficient bandwidth for all ingress ports to write one incoming packet per time period (e.g., one or more clock cycles) and for all egress ports to read one outgoing packet per time period. Details of the internal structure of a switch within a logical entity are further described with respect to FIGS. 2-4.

An egress port of a switch within logical entity 100 can be coupled to a peripheral device. As shown in FIG. 1, ports A, B and C of switch 110 are coupled to devices A, B and C, respectively; ports E and G of switch 120 are coupled to devices D and E, respectively; ports J, K and H of switch 130 are coupled to devices F, G and H, respectively. A device (e.g., device A-H) shown in FIG. 1 can be any type of device that can be coupled to, and transmit data with, a switch included in logic entity 100. Accordingly, devices A-H can send data (e.g., data packets) to and/or receive data from the remaining devices A-H through switch 110, 120 and/or 130. In the example of FIG. 1, devices A-H can be, for example, computer nodes, service nodes, routers, and storage nodes, etc. In some embodiments, device A-H can include servers, storage devices, gateways, workstations, and/or the like. Devices A-H can be coupled to additional devices or networks (not shown in FIG. 1), for example, where a device A-H is a gateway.

Control module 180 can be a hardware module combined with software (executing or stored in a hardware) that can control the switching operations of switches 110, 120 and 130. Specifically, control module 180 can gather information associated with the configuration and/or connection of each switch (e.g., to which device or switch port A of switch 110 is connected), and then store the gathered information in one or two tables (e.g., virtual ID table 500 in FIG. 5, forwarding state table 600 in FIG. 6) at control module 180. Alternatively, the configuration and/or connection information of switch 110, 120 and 130 can be entered into control module 180 by, for example, an operator or a network administrator of logical entity 100, as described in detail with respect to FIG. 11. Based on the configuration and/or connection information, a forwarding table (e.g., forwarding table 700, 800 or 900 shown in FIGS. 7-9) can be generated at control module 180 for switch 110, 120 or 130, and then sent to switch 110, 120 or 130. Thus, switch 110, 120 or 130 can be configured to forward an incoming packet according to the information provided in the forwarding table. For example, upon receiving a packet from device A via port A, switch 110 can be configured to send the packet to device B via port B, to device C via port C, or to switch 120 via port D, based on information included in the packet and information provided in a forwarding table received from control module 180. Details of forwarding packets according to a forwarding table received from a control module are described with respect to FIGS. 5-11.

In some embodiments, the logical entity 100 can have a group of virtual identifiers. Each switch 110, 120 or 130 can be uniquely associated with a set of virtual identifiers from the group of virtual identifiers. In some embodiments, each egress port (e.g., ports A-L) of switches 110, 120 and 130 can be uniquely assigned a virtual identifier from the set of virtual identifiers that is associated with the switch hosting the egress port. In the example of the logical entity 100, one of 12 virtual identifiers is uniquely assigned to each port from ports A-L, respectively. In such a way, every egress port within logical entity 100 can be globally (i.e., across switches 110, 120 and 130 but within the logical entity 100) identified by a unique virtual identifier. Furthermore, a virtual ID table (e.g., virtual ID table 500 in FIG. 5) and a forwarding state table (e.g., forwarding state table 600 in FIG. 6) that associate the egress ports with the virtual identifiers can be stored in control module 180. Details of virtual identifiers are described with respect to FIGS. 5-6.

Figure 2:
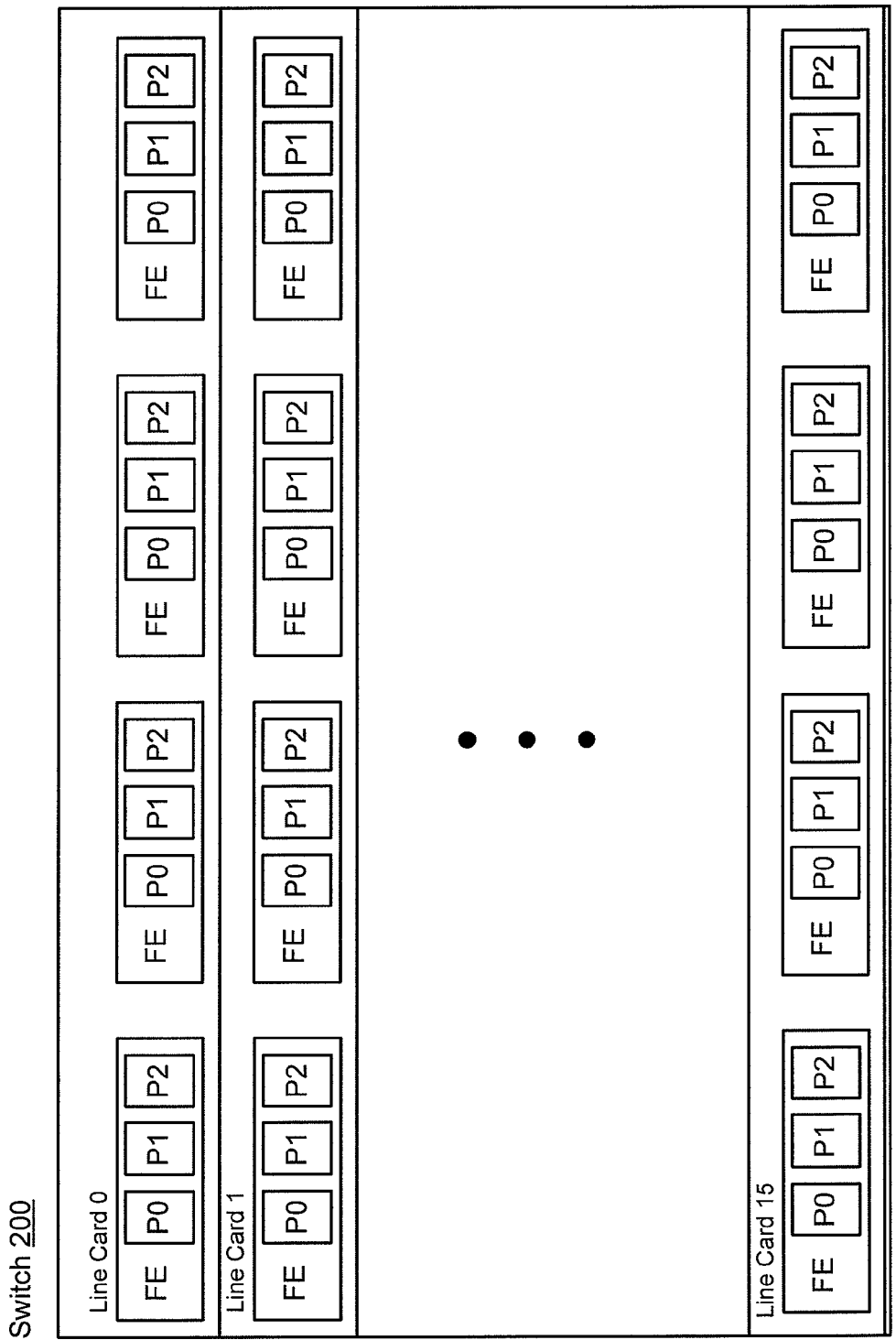
FIG. 2 is a schematic illustration of a switch having multiple forwarding engines, according to an embodiment.

FIG. 2 is a schematic illustration of a switch 200 having multiple forwarding engines, according to an embodiment. Switch 200 can be structurally and functionally similar to switch 110, 120 or 130 in FIG. 1. As shown in FIG. 2, switch 200 includes 16 line cards (i.e., line cards 0-15), each of which contains 4 forwarding engines (FEs). In some embodiments, each line card can be structurally and functionally similar to each other line card, and each forwarding engine can be structurally and functionally similar to each other forwarding engine.

The forwarding engines contained in line cards 0-15 can be configured to perform traffic forwarding. Specifically, each forwarding engine can have one or more ports that are used to forward network traffic to and from a logical entity hosting the forwarding engine. In the example of FIG. 2, each forwarding engine in line cards 0-15 within switch 200 has 3 ports, shown as P0, P1 and P2. Ports P0, P1 and P2 can be structurally and functionally similar to ports A-L in FIG. 1. Specifically, similar to ports D, E, H and I, some ports P0, P1 and P2 in line cards 0-15 can be used to interconnect switch 200 with one or more other switches, thus to forward packets between switch 200 and those switches. Similar to ports A, B, C, F, G, J, K and L, some other ports P0, P1 and P2 in line cards 0-15 can be used to interconnect switch 200 with one or more peripheral devices, thus to forward packets between switch 200 and those devices. In some embodiments, a port of a forwarding engine within a switch can be referred to as a virtual chassis port (VCP).

In some embodiments, each port P0, P1 or P2 in line cards 0-15 can be globally identified by a unique virtual identifier (i.e., virtual ID). That is, each port is assigned a unique virtual identifier that is different than a virtual identifier assigned to any other port within the logical entity hosting switch 200. As a result, each forwarding engine can be globally identified by a set of virtual identifiers, each of which identifies a port of that forwarding engine. Similarly, switch 200 can be uniquely associated with a group of virtual identifiers, which is a combination of the sets of virtual identifiers for all the forwarding engines in line cards 0-15 within switch 200. Thus, one or more virtual identifiers can be used to globally address a forwarding engine in switch 200. Furthermore, line cards 0-15 are internally coupled to each other within switch 200, such that a packet received at a port within a line card 0-15 can be transmitted to and then sent out from another port within a line card 0-15, based on the virtual identifiers uniquely assigned to the ports. For example, a packet received at port P1 of the second forwarding engine in line card 1 can be forwarded to the third forwarding engine in line card 15, and then sent out from port P2 of that forwarding engine. Details of forwarding packets based on virtual identifiers within a switch are described with respect to FIGS. 5-11.

Figure 3:
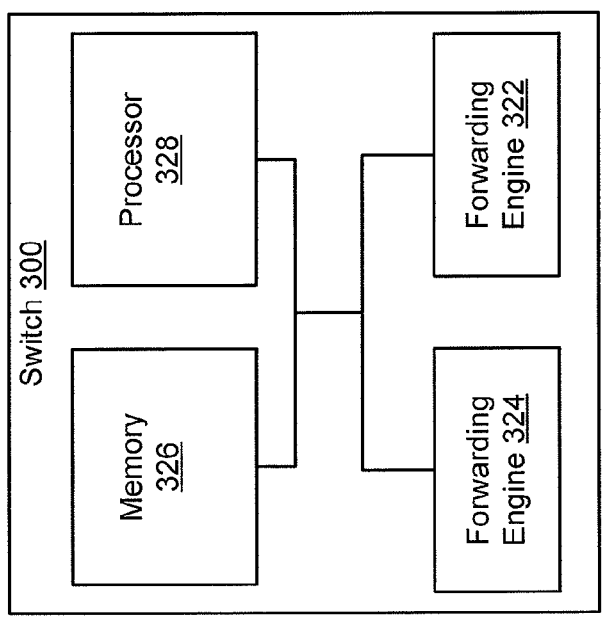
FIG. 3 is a system block diagram of the internal structure of a switch, according to an embodiment.

FIG. 3 is a system block diagram of the internal structure of a switch 300, according to an embodiment. Similar to switch 110, 120 or 130 in FIG. 1, switch 300 can be an assembly of electronic components and circuitry, or an application-specific integrated circuit (ASIC), that can be configured to redirect data (e.g., data packets) as it flows through switch 300. In some embodiments, switch 300 can be an assembly of discrete electronic components. In some other embodiments, switch 300 can be contained together with other switches on a single ASIC or a single chip package.

As shown in FIG. 3, switch 300 includes processor 328, memory 326, forwarding engines 322 and 324. Each component of switch 300 is operatively coupled to each of the remaining components of switch 300. Each operation of forwarding engine 322 or 324 (e.g., receive/transmit packets), and each manipulation on memory 326 (e.g., update a forwarding table), is controlled by processor 328. The memory 326 can be configured to store a forwarding table (e.g., forwarding table 700, 800 or 900 shown in FIGS. 7-9) associated with switch 300. In some embodiments, the memory 326 can be, for example, a random-access memory (RAM) (e.g., a dynamic RAM, a static RAM), a flash memory, a removable memory, and/or so forth. Similar to the forwarding engines included in line cards 0-15 shown in FIG. 2, forwarding engines 322 and 324 can be hosted on one or two line cards (not shown in FIG. 3). Furthermore, forwarding engines 322 and 324 can be configured to receive and transmit packets.

Similar to switch 110, 120 or 130 in FIG. 1, switch 300 can be configured to forward data to another switch or a device coupled to a port of switch 300 (not shown in FIG. 3). Specifically, a packet can be received at a first port of a forwarding engine 322 or 324 within switch 300. The packet can be received from a first device or a first switch coupled to switch 300 via the first port. Upon receiving the packet, processor 328 can be configured to retrieve routing information from the received packet, such as a destination address (e.g., a media access control (MAC) address, an IP address) of the packet. Based on the retrieved information, processor 328 can query a forwarding table stored in memory 326, and then determine an egress port for the packet based on the destination address of the packet. The egress port for the packet can be a second port of a forwarding engine 322 or 324 within switch 300, which is different from the first port. As a result, the packet can be sent, via the second port, to a second device or a second switch coupled to switch 300 via the second port. For example, a packet can be received at a port of forwarding engine 324 and sent out of switch 300 via a port of forwarding engine 322. For another example, a packet can be received at a port of forwarding engine 324 and sent out of switch 300 via another port of forwarding engine 324.

Figure 4:
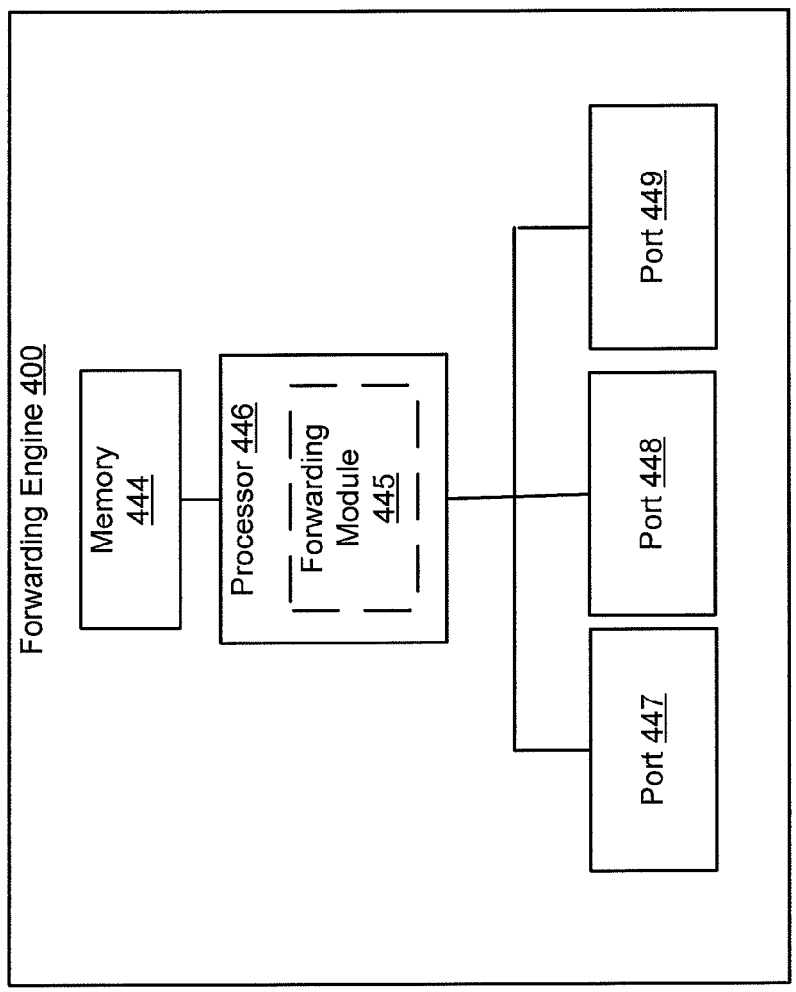
FIG. 4 is a system block diagram of the internal structure of a forwarding engine, according to an embodiment.

FIG. 4 is a system block diagram of the internal structure of a forwarding engine 400, according to an embodiment. As shown in FIG. 4, forwarding engine 400 includes memory 444; processor 446, which includes forwarding module 445; and ports 447, 448 and 449. Each component of forwarding engine 400 is operatively coupled to each of the remaining components of forwarding engine 400. Each operation of forwarding engine 400, including receiving packets from or sending packets out via ports 447, 448 or 449, and each manipulation on memory 444, is controlled by processor 446. Particularly, the operation of forwarding packets is controlled by forwarding module 445 within processor 446. In some embodiments, the memory 444 can be, for example, a random-access memory (RAM) (e.g., a dynamic RAM, a static RAM), a flash memory, a removable memory, and/or so forth.

Forwarding engine 400 can be structurally and functionally similar to the forwarding engines included in line cards 0-15 in FIG. 2, or forwarding engine 322 or 324 in FIG. 3. Specifically, forwarding engine 400 can be hosted on a line card within a switch (e.g., line cards 0-15 within switch 200 in FIG. 2). As a result, forwarding engine 400 can be operatively coupled to one or more other forwarding engines that are hosted in the same or a different line card within the switch via, for example, an internal channel within the switch. Thus, forwarding engine 400 can be configured to receive packets from and/or forward packets to other forwarding engines, or a device or a switch coupled to forwarding engine 400, via port 447, 448 or 449. For example, processor 446 can be configured to control forwarding engine 400 to receive a packet from another forwarding engine via an internal channel. Forwarding module 445 can then be configured to send the packet, via port 447, to a device coupled to port 447. For another example, processor 446 can be configured to control forwarding engine 400 to receive a packet, via port 449, from a switch coupled to port 449. Forwarding module 445 can then be configured to send the packet, via port 448, to another switch coupled to port 448.

FIG. 5 is a schematic illustration of a virtual ID table 500, which associates switch identifiers, local identifiers and virtual identifiers of a logical entity, according to an embodiment. Virtual ID table 500 can be hosted at a centralized location within the logical entity, such as a control module. The control module hosting virtual ID table 500 can be operatively coupled to one or more switches included in the logical entity, and can control the operations of the switches based on the information provided from virtual ID table 500 and/or some other resources (e.g., forwarding state table 600 shown in FIG. 6). For example, as shown in FIG. 1, virtual ID table 500 can be stored in control module 180, which controls the operation of switch 110, 120 and 130 based on information provided from virtual ID table 500.

As shown in FIG. 5, virtual ID table 500 has three columns of entries, shown as switch ID 510, FE ID/port ID 512, and virtual ID 514. The first column, switch ID 510, contains switch identifiers (e.g., 110, 120, 130), each of which identifies a switch within the logical entity that is coupled to and controlled by the control module hosting virtual ID table 500. The second column, FE ID/port ID 512, contains local identifiers (e.g., 0/0, 0/1, etc.), each of which includes a forwarding engine (FE) identifier (e.g., 0, 1, etc.) and a port identifier (e.g., 0, 1, etc.). Each local identifier identifies a unique port within a given switch. For example, local identifier 0/1 that is in the same entry (i.e., row) with switch identifier 110 in virtual ID table 500 identifies the port represented by forwarding engine identifier 0 and port identifier 1 in switch 110. For another example, local identifier 63/2 that is in the same entry with switch identifier 120 identifies the port represented by forwarding engine identifier 63 and port identifier 2 in switch 120. The third column, virtual ID 514, contains virtual identifiers (e.g., 0, 1, etc.), each of which uniquely identifies a port within the logical entity hosting virtual ID table 500. For example, virtual identifier 191 that is in the same entry with switch identifier 110 and local identifier 63/2 identifies the port represented by forwarding engine identifier 63 and port identifier 2 in switch 110. For another example, virtual identifier 386 that is in the same entry with switch identifier 130 and local identifier 0/2 identifies the port represented by forwarding engine identifier 0 and port identifier 2 in switch 130.

In the example of FIG. 5, three switches represented by switch identifiers 110, 120 and 130 are included in the logical entity that hosts virtual ID table 500. Similar to switch 200 shown in FIG. 2, each of the three switches has 64 forwarding engines, and each forwarding engine contains three ports. As shown in FIG. 5, the 64 forwarding engines within each switch are represented by forwarding engine identifiers 0-63, and the three ports of each forwarding engine are represented by port identifiers 0, 1 and 2. As a result, the logical entity has a total of 576 unique ports, represented by virtual identifiers 0-575.

In virtual ID table 500, each local identifier associated with a given switch differs from the remaining local identifiers associated with that switch. For example, local identifier 0/0 associated with switch 110 differs from all other local identifiers associated with switch 110. In contrast, each virtual identifier differs from all the remaining virtual identifiers across all the switches within the logical entity. In other words, each virtual identifier globally identifies a unique port within the logical entity, independent of the switch hosting the port. Furthermore, each switch included in the logical entity is associated with a different set of virtual identifiers. Specifically, switch 110 is associated with virtual identifiers 0-191; switch 120 is associated with virtual identifiers 192-383; switch 130 is associated with virtual identifiers 384-575.

FIG. 6 is a schematic illustration of a forwarding state table 600, which associates virtual identifiers, local identifiers, connections and addresses, according to an embodiment. Similar to virtual ID table 500 shown in FIG. 5, forwarding state table 600 can be hosted at, for example, a control module within a logical entity. As a result, the control module hosting forwarding state table 600 and/or a virtual ID table (e.g., virtual ID table 500) can control the operations of multiple switches coupled to the control module based on the information provided from forwarding state table 600, the virtual ID table, and/or some other resources. For example, in reference to FIG. 1, forwarding state table 600 can be stored in control module 180, which controls the operation of switch 110, 120 and 130 based on information provided from forwarding state table 600. In some embodiments, as described in herein, the control module can be configured to send the forwarding state table to each switch coupled to the control module within the logical entity, such that packets received at a switch can be appropriately forwarded at that switch according to the forwarding table. In other embodiments, as described in detail with respect to FIGS. 7-9, the control module can be configured to send a forwarding table (e.g., forwarding table 700, 800 or 900 shown in FIGS. 7-9) to each switch coupled to the control module within the logical entity, such that packets received at a switch can be appropriately forwarded at that switch according to the forwarding table for that switch. Specifically, the forwarding table can be generated based on a forwarding state table (e.g., forwarding state table 600) and a virtual ID table (e.g., virtual ID table 500) at the control module.

As shown in FIG. 6, forwarding state table 600 has four columns of entries, shown as virtual ID 610, FE ID/port ID 620, connection 630, and address 640. Similar to the third column 514 of virtual ID table 500 shown in FIG. 5, the first column virtual ID 610 contains virtual identifiers (e.g., 0, 23, etc.), each of which uniquely identifies a port that is coupled to a device or a switch within the logical entity hosting forwarding state table 600. Similar to the second column 512 of virtual ID table 500 shown in FIG. 5, the second column FE ID/port ID 620 contains local identifiers (e.g., 0/0, 7/2, etc.), each of which includes a forwarding engine identifier and a port identifier. Each local identifier identifies a port that is coupled to a device or a switch. The third column, connection 630, contains identifiers of a device or a switch (e.g., device A, switch 110, etc.), each of which identifies a device or a switch that is coupled to the port identified by the virtual identifier in the same entry. The fourth column, address 640, contains addresses of a device or a switch (e.g., 01:23:45:67:89:ab, etc.), each of which identifies an address (e.g., MAC address) of a device or a switch that is coupled to the port identified by the virtual identifier in the same entry. In some embodiments, an address of a switch can be represented by a switch identifier of the switch, such as switch 110, switch 120, etc., as shown in FIG. 6.

Collectively, an entry of forwarding state table 600, including a virtual identifier, a local identifier, a connection and an address, identifies a device or a switch that is coupled to a port of the logical entity. Furthermore, the virtual identifier can be determined to be associated with a switch of the logical entity based on, for example, a virtual ID table (e.g., virtual ID table 500 shown in FIG. 5) stored in the control module hosting forwarding state table 600 in the logical entity. For example, virtual identifier 0 in the first entry of forwarding state table 600 can be determined to be associated with switch 110 based on the first entry of virtual ID table 500. For another example, virtual identifier 191 in the 4$^{th}$ entry of forwarding state table 600 can be determined to be associated with switch 110 based on the 192$^{nd}$ entry of virtual ID table 500.

In the example of FIGS. 1, 5 and 6, information of connections associated with switches 110, 120 and 130 is stored in virtual ID table 500 and forwarding state table 600, which are stored at control module 180 of the logical entity 100. Specifically, each entry of forwarding state table 600 stores information associated with a port of switch 110, 120 or 130 that is coupled to a device or another switch within the logical entity 100. For example, the first entry of forwarding state table 600 (including virtual identifier 0, local identifier 0/0, connection "device A" and address "01:23:45:67:89:ab") indicates that device A with MAC address 01:23:45:67:89:ab is coupled to a port represented by virtual identifier 0, or equivalently, a port represented by local identifier 0/0 of a switch associated with virtual identifier 0. Based on the first entry of virtual ID table 500, the switch associated with virtual identifier 0 is switch 110. Thus, it is indicated that device A with MAC address 01:23:45:67:89:ab is coupled to a port represented by local identifier 0/0 (i.e., a port represented by port identifier 0 in a forwarding engine represented by forwarding engine identifier 0) of switch 110, as shown in FIG. 1. The port represented by local identifier 0/0 of switch 110 is port A in FIG. 1. For another example, the $4^{th}$ entry of forwarding state table 600 (including virtual identifier 191, local identifier 63/2, connection "switch 120" and "switch 120") indicates that switch 120 is coupled to a port represented by virtual identifier 191, or equivalently, a port represented by local identifier 63/2 of a switch associated with virtual identifier 191. Based on the $192^{nd}$ entry of virtual ID table 500, the switch associated with virtual identifier 191 is switch 110. Thus, it is indicated that switch 120 is coupled to a port represented by local identifier 63/2 (i.e., a port represented by port identifier 2 in a forwarding engine represented by forwarding engine identifier 63) of switch 110, as shown in FIG. 1. The port represented by local identifier 63/2 of switch 110 is port D in FIG. 1. Similarly, every other entry of forwarding state table 600 can be interpreted to determine a device or a switch being coupled to a port of switch 110, 120 or 130 within the logical entry 100. In such a way, virtual ID table 500 and forwarding state table 600 collectively store information of every connection between a port of the logical entity 100 and a device or a switch. As mentioned above, the control module can be configured to send the forwarding state table to each switch coupled to the control module within the logical entity, such that packets received at a switch can be appropriately forwarded at that switch according to the forwarding table.

In other embodiments, the control module can be configured to send a forwarding table (e.g., forwarding table 700, 800 or 900 shown in FIGS. 7-9) to each switch coupled to the control module within the logical entity, such that packets received at a switch can be appropriately forwarded at that switch according to the forwarding table for that switch. Specifically, the forwarding table can be generated based on a forwarding state table (e.g., forwarding state table 600) and a virtual ID table (e.g., virtual ID table 500) at the control module.

FIG. 7 is schematic illustration of a forwarding table 700, which associates MAC addresses and local identifiers, according to an embodiment. Unlike a virtual ID table (e.g., virtual ID table 500 in FIG. 5) or a forwarding state table (e.g., forwarding state table 600 in FIG. 6) that stores information associated with multiple switches included in a single logical entity, forwarding table 700 includes information associated with a single switch only. Specifically, forwarding table 700 stores information associated with forwarding packets, within that switch, to ports of that switch based on MAC addresses of the destinations of the packets.

As shown in FIG. 7, forwarding table 700 has two columns of entries, shown as MAC address 710 and FE ID/port ID 720. Similar to the $4^{th}$ column 640 of forwarding state table 600 shown in FIG. 6, the first column MAC address 710 contains MAC addresses (e.g., 01:23:45:67:89:ab, 11:22:33:44:55:66, etc.), each of which identifies a MAC address of a device that is a potential destination of a packet. Similar to the second column 512 of virtual ID table 500 shown in FIG. 5 and the second column 620 of forwarding state table 600 shown in FIG. 6, the second column FE ID/port ID 720 contains local identifiers (e.g., 0/1, 7/2, etc.), each of which identifies a port of the switch associated with forwarding table 700.

Collectively, an entry of forwarding table 700, including a MAC address of a device and a local identifier of a port in the switch, defines information associated with forwarding packets at the switch, where the packets are destined to the device. Specifically, packets destined to the device and received at the switch can be sent out of the switch via the port of the switch that is identified by the local identifier. In the example of FIGS. 1 and 5-7, forwarding table 700 is associated with switch 110 included in the logical entity 100. In other words, forwarding table 700 stores information associated with forwarding packets received at switch 110. For example, the first entry of forwarding table 700 (including MAC address 01:23:45:67:89:ab and local identifier 0/0) indicates that packets received at switch 110 and destined to MAC address 01:23:45:67:89:ab (i.e., device A according to the first entry of forwarding state table 600) can be sent out of switch 110 via a port identified by local identifier 0/0 in switch 110. Thus, packets received at switch 110 and destined to device A can be forwarded to device A via the port identified by local identifier 0/0 in switch 110 (i.e., port A) according to the first entry of forwarding table 700. For another example, the second entry of forwarding table 700 (including MAC address 11:22:33:44:55:66 and local identifier 7/2) indicates that packets received at switch 110 and destined to MAC address 11:22:33:44:55:66 (i.e., device B according to the second entry of forwarding state table 600) can be sent out of switch 110 via a port identified by local identifier 7/2 in switch 110. Thus, packets received at switch 110 and destined to device B can be forwarded to device B via the port identified by local identifier 7/2 in switch 110 (i.e., port B) according to the second entry of forwarding table 700.

In some embodiments, packets received at a first switch and destined to a device that is not directly coupled to any port of the first switch can be forwarded to a second switch coupled to the first switch, according to an entry of a forwarding table associated with the first switch. For example, the $4^{th}$ entry of forwarding table 700 (including MAC address 00:12:33:44:55:66 and local identifier 63/2) indicates that packets received at switch 110 and destined to MAC address 00:12:33:44:55:66 (i.e., device D according to the $6^{th}$ entry of forwarding state table 600) can be sent out of switch 110 via a port identified by local identifier 63/2 in switch 110. Thus, packets received at switch 110 and destined to device D can be forwarded to switch 120 via the port identified by local identifier 63/2 in switch 110 (i.e., port D) according to the $4^{th}$ entry of forwarding table 700. Furthermore, the packets sent from switch 110 to switch 120 can be further forwarded to device D via port F of switch 120 according to a forwarding table associated with switch 120 (discussed below in reference to FIG. 8).

In some embodiments, a forwarding table associated with a switch can be generated from a virtual ID table and a forwarding state table at a control module coupled to the switch, and then sent from the control module to the switch. Specifically, information of port connections of the switch can be retrieved from entries associated with the switch from the virtual ID table and the forwarding state table, and then used to generate entries associated with forwarding packets to those ports of the switch in the forwarding table. In the example of FIGS. 5-7, information associated with switch 110 is retrieved from virtual ID table 500 and forwarding state table 600 to generate forwarding table 700 at a control module (e.g., control module 180 in FIG. 1). For example, based on the first entry of virtual ID table 500 and the first entry of forwarding state table 600, it can be determined that device A with MAC address 01:23:45:67:89:ab is coupled to switch 110 via a port identified by local identifier 0/0 of switch 110 (i.e., port A shown in FIG. 1). Thus, packets received at switch 110 and destined to device A can be sent out of switch 110 via the port identified by local identifier 0/0 of switch 110. As a result, the first entry of forwarding table 700 generated by the control module includes MAC address 01:23:45:67:89:ab and local identifier 0/0. For another example, based on the $192^{nd}$ entry of virtual ID table 500 (for virtual ID 191) and the $4^{th}$ entry of forwarding state table 600, it can be determined that switch 120 is coupled to switch 110 via a port identified by local identifier 63/2 of switch 110 (i.e., port D shown in FIG. 1). Thus, packets received at switch 110 and destined to the devices that have to be reached through switch 120 from switch 110 can be sent out of switch 110 via the port identified by local identifier 63/2 of switch 110. As a result, the $4^{th}$-$8^{th}$ entries of forwarding table 700 generated by the control module include the MAC addresses of those devices and local identifier 63/2. Furthermore, upon on generating forwarding table 700, the control module can be configured to send forwarding table 700 to switch 110. Subsequently, forwarding table 700 can be implemented at switch 110. Thus, packets received at switch 110 can be forwarded according to forwarding table 700 within switch 110. In some embodiments, a routing engine (RE) associated with a control module is used to generate a forwarding table from a virtual ID table and/or a forwarding state table.

Similar to FIG. 7, FIG. 8 and FIG. 9 are schematic illustrations of forwarding table 800 and forwarding table 900, which associate MAC addresses and local identifiers for two switches, respectively, according to an embodiment. Forwarding tables 800 and 900 can be structurally and functionally similar to forwarding table 700. In the example of FIGS. 1 and 5-9, similar to forwarding table 700 being associated with switch 110 included in the logical entity 100, forwarding tables 800 and 900 are associated with switch 120 and 130, respectively. Accordingly, forwarding tables 800 and 900 can be sent from the control module to switches 120 and 130, respectively. Collectively, forwarding tables 700, 800 and 900 can be used to determine how packets are forwarded within the logical entity 100. Furthermore, similar to forwarding table 700, forwarding tables 800 and 900 can be generated from virtual ID table 500 and forwarding state table 600 at a control module (e.g., control module 180 in FIG. 1) coupled to the switches associated with forwarding tables 800 and 900.

Packets destined to a destination device can be received at a first switch from a device or a second switch coupled to the first switch. In some embodiments, when the destination device is directly coupled to the first switch via a port of the first switch, the received packets can be forwarded to the destination device via the port according to a forwarding table associated with the first switch. For example, a packet destined to device F with a MAC address aa:bb:cc:dd:ee:ff is received at switch 130 from, for example, device H via port L or switch 120 via port I. According to the $6^{th}$ entry of forwarding table 900 that is associated with switch 130, a packet destined to a device with MAC address aa:bb:cc:dd:ee:ff can be sent out of switch 130 via a port identified by local identifier 0/2 of switch 130. Based on the $387^{th}$ entry of virtual ID table 500 (for virtual ID 386) and the $10^{th}$ entry of forwarding state table 600, the port identified by local identifier 0/2 of switch 130 is port J as shown in FIG. 1, which is coupled to device F. Thus, the packet is forwarded from switch 130 to device F via port J.

In some other embodiments, when the destination device is not directly coupled to the first switch via any port of the first switch, the received packets can be forwarded, through one or more other switches as intermediary hops, to the destination device, according to the forwarding tables associated with the first switch and the intermediary switches. For example, a packet destined to device G with a MAC address 01:00:01:00:01:00 is received at switch 110 from, for example, device C via port C. According to the $7^{th}$ entry of forwarding table 700 that is associated with switch 110, a packet destined to a device with MAC address 01:00:01:00:01:00 can be sent out of switch 110 via a port identified by local identifier 63/2 of switch 110. Based on the $192^{nd}$ entry of virtual ID table 500 (for virtual ID 191) and the $4^{th}$ entry of forwarding state table 600, the port identified by local identifier 63/2 of switch 110 is port D as shown in FIG. 1, which is coupled to switch 120. Thus, the packet is forwarded from switch 110 to switch 120 via port D. Next, according to the $7^{th}$ entry of forwarding table 800 that is associated with switch 120, a packet destined to a device with MAC address 01:00:01:00:01:00 can be sent out of switch 120 via a port identified by local identifier 63/2 of switch 120. Based on the $384^{th}$ entry of virtual ID table 500 (for virtual ID 383) and the $8^{th}$ entry of forwarding state table 600, the port identified by local identifier 63/2 of switch 120 is port H as shown in FIG. 1, which is coupled to switch 130. Thus, the packet is further forwarded from switch 120 to switch 130 via port H. Lastly, according to the $7^{th}$ entry of forwarding table 900 that is associated with switch 130, a packet destined to a device with MAC address 01:00:01:00:01:00 can be sent out of switch 130 via a port identified by local identifier 9/0 of switch 130. Based on the $412^{th}$ entry of virtual ID table 500 (for virtual ID 411; not shown in FIG. 5) and the $11^{th}$ entry of forwarding state table 600, the port identified by local identifier 9/0 of switch 130 is port K as shown in FIG. 1, which is coupled to device G. Thus, the packet is finally forwarded from switch 130 to device G via port K.

In such a way, packets can be forwarded within a logical entity according to one or more forwarding tables, such as forwarding tables 700, 800 and 900, at one or more switches included in the logical entity. Such a method provides an abstraction at the software level to address potentially a large number of forwarding engines and/or ports by differentiating between local identifiers (e.g., including forwarding engine identifiers and port identifiers) based on whether they belong to the same switch. Particularly, packets received at a first switch can be re-routed to a second switch if the local identifiers associated with the packets are not local to the first switch. As a result, this method allows a large number of switches to interconnect to form a single logical entity (e.g., virtual chassis), and thus a large number of switches and ports can be managed as a single network element.

Figure 10:
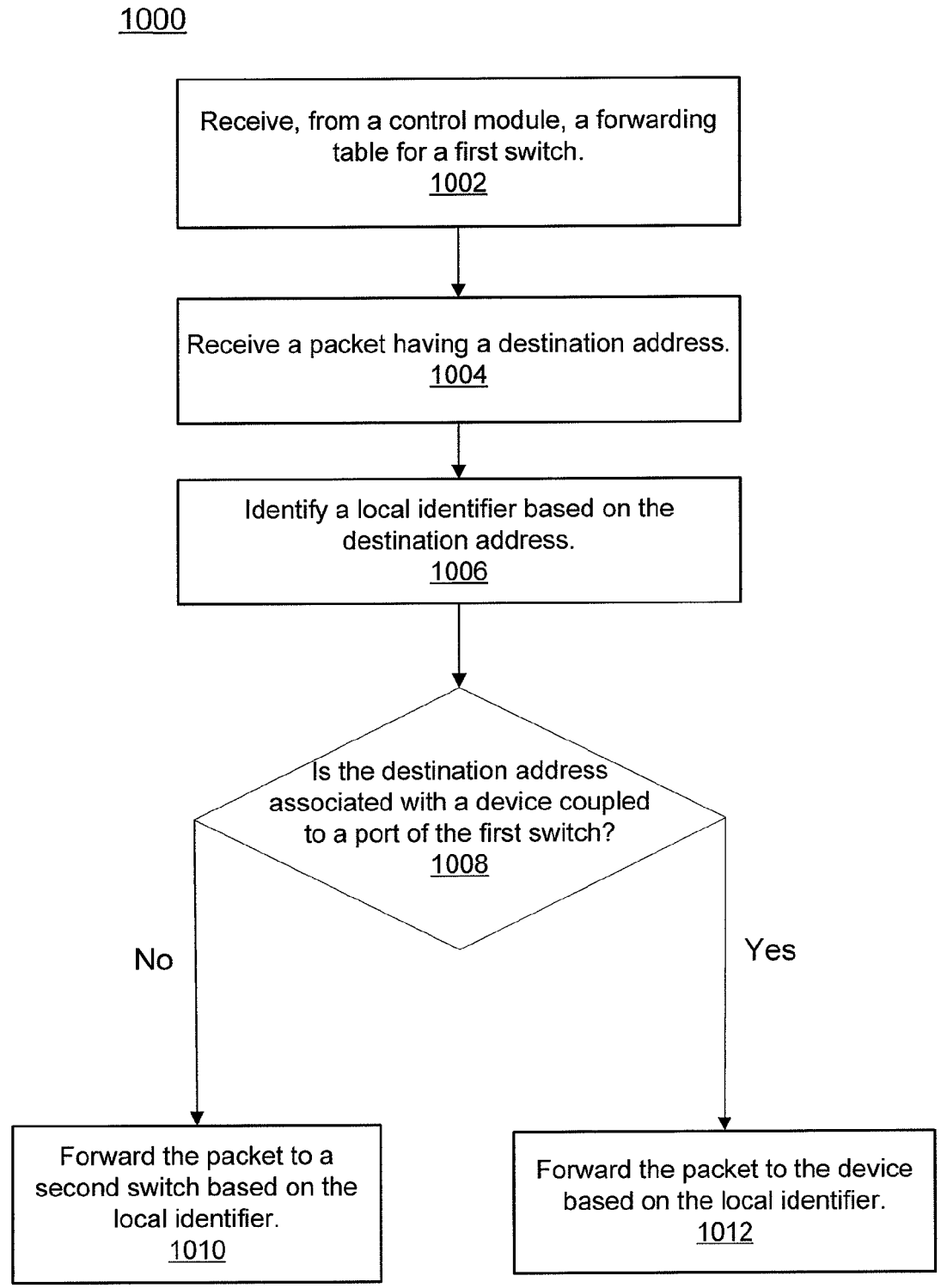
FIG. 10 is a flow chart of a method for forwarding a packet to a device by a logical entity including multiple switches, according to an embodiment.

FIG. 10 is a flow chart of a method for forwarding a packet to a device by a logical entity including multiple switches, according to an embodiment. Although FIG. 10 is described in reference to a forwarding table, it should be understood that forwarding state table can be used in the alternative such that the steps of FIG. 10 are applied with respect to the forwarding state table.

At 1002, a forwarding table for a first switch can be received from a control module. The forwarding table can be generated from a virtual ID table and a forwarding state table that are stored in the control module. Specifically, information associated with the first switch can be retrieved from entries of the virtual ID table and/or the forwarding state table to generate entries of the forwarding table for the first switch. After the forwarding table is generated, the control module can be configured to send the forwarding table to the first switch, at which the forwarding table is implemented. As a result, packets received at the first switch can be forwarded according to information provided from the forwarding table for the first switch.

In the example of FIGS. 1 and 5-9, as described herein, forwarding table 700, 800 and 900 can be generated based on virtual ID table 500 and forwarding state table 600 for switch 110, 120 and 130, respectively, at control module 180. Control module 180 can then be configured to send forwarding table 700, 800 and 900 to switch 110, 120 and 130, respectively. Upon receiving forwarding table 700, 800 or 900, switch 110, 120 or 130 can be configured to implement the corresponding forwarding table, such that packets received at switch 110, 120 or 130 can be forwarded according to the corresponding forwarding table.

At 1004, a packet having a destination address can be received at the first switch. The packet can be received from a device or another switch directly coupled to the first switch via a port. The packet can be destined to a destination device, which is identified by a destination address included in the packet. The destination address can be, for example, a MAC address of the destined device. In the example of FIGS. 1 and 5-9, a packet can be received at switch 120 from, for example, switch 110 via port E, or device D via port F, etc. Furthermore, the packet can include a destination address such as a MAC address 00:11:22:33:44:55 for device E (according to the $7^{th}$ entry of forwarding state table 600), or a MAC address aa:bb:cc:dd:ee:ff for device F (according to the $10^{th}$ entry of forwarding state table 600), etc.

At 1006, a local identifier can be identified based on the destination address at the first switch. Specifically, the local identifier associated with the destination address can be identified based on an entry of the forwarding able for the first switch that includes both the local identifier and the destination address. For example, when a packet having a destination MAC address 00:11:22:33:44:55 is received at switch 120, according to the $5^{th}$ entry of forwarding table 800 that is associated with switch 120, a local identifier 26/1 can be identified for the packet based on the destination MAC address 00:11:22:33:44:55. For another example, when a packet having a destination MAC address aa:bb:cc:dd:ee:ff is received at switch 120, according to the $6^{th}$ entry of forwarding table 800 that is associated with switch 120, a local identifier 63/2 can be identified for the packet based on the destination MAC address aa:bb:cc:dd:ee:ff.

At 1008, whether the destination address is associated with a device coupled to a port of the first switch can be determined. Specifically, the determination can be made based on the local identifier associated with the destination address. If the local identifier associated with the destination address identifies a port of the first switch that is coupled to a device, it indicates that the destination address is associated with the device coupled to that port of the first switch. Otherwise, if the local identifier associated with the destination address identifies a port of the first switch that is coupled to another switch, it indicates that the destination address is not associated with any device coupled to a port of the first switch. Instead, the destination address is associated with a device operatively coupled to the other switch, which is coupled to the first switch via that port. Note that the determining of whether a destination address is associated with a device coupled directly to the switch is optional; instead, the packet can be delivered based on the local identifier as described below at 1010 and 1012.

For example, local identifier 26/1 is identified based on destination MAC address 00:11:22:33:44:55 at switch 120, according to the $5^{th}$ entry of forwarding table 800. Based on FIG. 1 and the $7^{th}$ entry of forwarding state table 600, local identifier 26/1 of switch 120 identifies port G of switch 120 that is coupled to device E. Thus, destination MAC address 00:11:22:33:44:55 is determined to be associated with device E coupled to port G of switch 120. For another example, local identifier 63/2 is identified based on destination MAC address aa:bb:cc:dd:ee:ff at switch 120, according to the $6^{th}$ entry of forwarding table 800. Based on FIG. 1 and the $8^{th}$ entry of forwarding state table 600, local identifier 63/2 of switch 120 identifies port H of switch 120 that is coupled to switch 130. Thus, destination MAC address aa:bb:cc:dd:ee:ff is determined to be associated with switch 130 coupled to port H of switch 120, instead of any device coupled to a port of switch 120.

Although in above examples the association between a local identifier of a switch and a port of the switch is determined based on a forwarding state table stored in a control module coupled to the switch, in practical implementations, such an association can be determined within the switch. That is, the information associated with identifications for ports of the switch by local identifiers of the switch is available at the switch. Thus, the switch typically does not query the control module to associate a local identifier to a port of the switch.

At 1010, if the destination address is not associated with a device coupled to a port of the first switch, the packet can be forwarded to a second switch based on the local identifier. Specifically, the destination address can be determined to be associated with the second switch, which is coupled to the first switch via a port of the first switch, based on the local identifier. In some cases, the destination address can be associated with a device directly coupled to the second switch. In some other cases, the destination address can be associated with a device operatively coupled to the second switch through one or more other switches. In both scenarios, the first switch can be configured to forward the packet to the second switch via the port of the first switch. For example, based on local identifier 63/2 of switch 120 associated with MAC address aa:bb:cc:dd:ee:ff, destination MAC address aa:bb:cc:dd:ee:ff is determined to be associated with switch 130 coupled to port H of switch 120, instead of any device coupled to a port of switch 120. As a result, the packet destined to MAC address aa:bb:cc:dd:ee:ff is forwarded to switch 130 from switch 120 via port H of switch 120. The packet can be further forwarded to the destination device by switch 130.

At 1012, if the destination address is associated with a device coupled to a port of the first switch, the packet can be forwarded to the device based on the local identifier. Specifically, the destination address can be determined to be the address of the device coupled to the port of the first switch. Furthermore, the port of the switch can be identified by the local identifier of the first switch associated with the destination address. Thus, the packet having the destination address can be forwarded to the device via the port of the first switch. For example, based on local identifier 26/1 of switch 120 associated with MAC address 00:11:22:33:44:55, destination MAC address 00:11:22:33:44:55 is determined to be associated with device E coupled to port G of switch 120. As a result, the packet destined to MAC address 00:11:22:33:44:55 is forwarded to device E from switch 120 via port G of switch 120.

Figure 11:
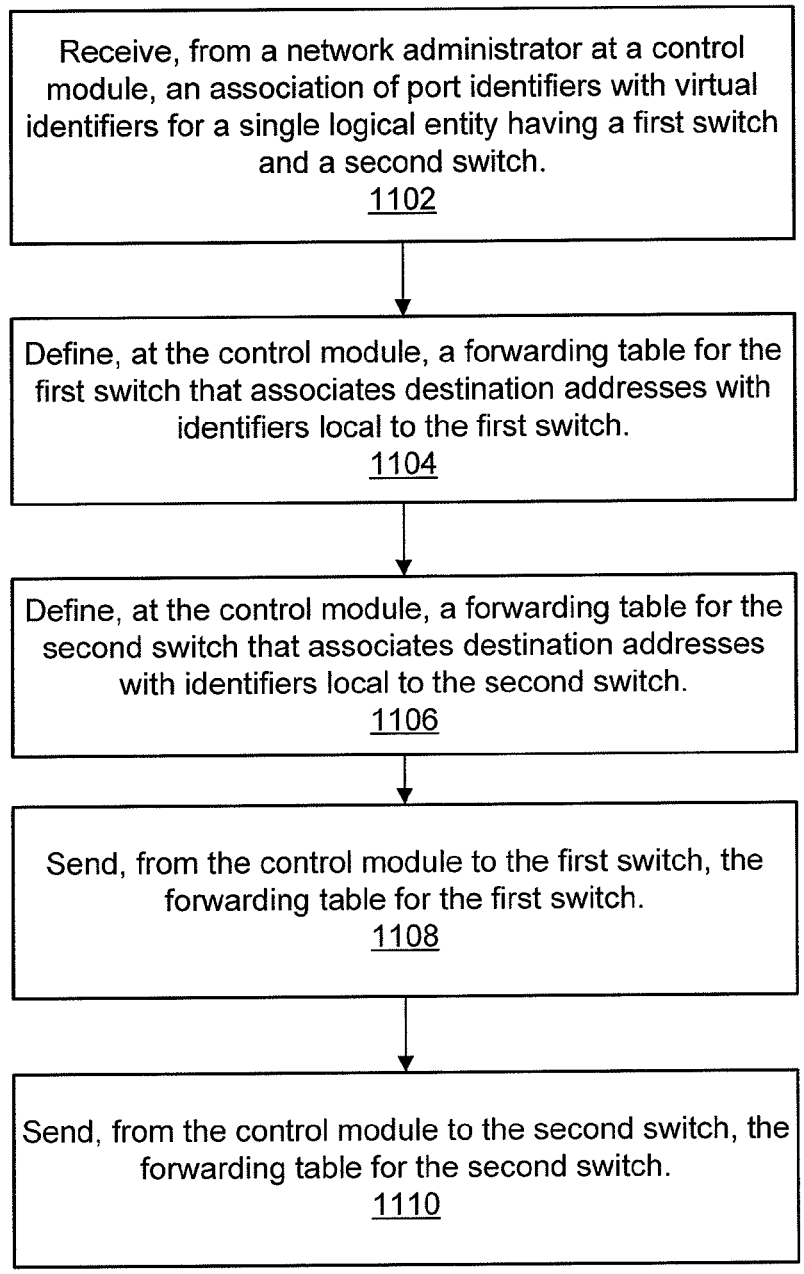
FIG. 11 is a flow chart of a method for defining and implementing forwarding tables in a logical entity including multiple switches, according to an embodiment.

FIG. 11 is a flow chart of a method for defining and implementing forwarding tables in a logical entity including multiple switches, according to an embodiment. Although FIG. 11 is described in reference to a forwarding table, it should be understood that forwarding state table can be used in the alternative such that the steps of FIG. 11 are applied with respect to the forwarding state table. In such an alternative, the same forwarding state table will defined for all switches (e.g., the first switch and the second switch) and will be sent to those switches.

At 1102, an association of port identifiers with virtual identifiers for a single logical entity can be received, for example, from a network administrator at a control module, where the single logical entity has at least a first switch and a second switch. Specifically, the network administrator can assign a unique virtual identifier to each port, which is identified by a port identifier, of a switch included in the logical entity. In other words, each port identifier of the logical entity is uniquely associated with a virtual identifier. Subsequently, the network administrator can enter the association information into, for example, a virtual ID table and a forwarding state table stored at the control module that is coupled to every switch included in the logical entity. As a result, the association of port identifiers and virtual identifiers can be stored within the virtual ID table and the forwarding state table in the control module. Some other information related to configurations and/or connections of each switch can also be stored in the virtual ID table and the forwarding state table in the control module. Such information can include, for example, MAC addresses of devices coupled to the ports of the switches, connections between two switches within the logical entity, etc.

In the example of FIGS. 1 and 5-9, an association of port identifiers representing port A-L for switches 110, 120, 130 with virtual identifiers (e.g., 0, 1, 2, etc.) for the logical entity 100 can be defined by a network administrator (not shown in FIG. 1). The association, together with some other information, can then be entered by the network administrator into control module 180 to generate virtual ID table 500 and forwarding state table 600. As a result, the association of a port identifier (included in a local identifier) with a virtual identifier for a port of the logical entity 100 is included in every entry of virtual ID table 500 and forwarding state table 600.

At 1104, a forwarding table for the first switch that associates destination addresses with identifiers local to the first switch can be defined at the control module. The forwarding table for the first switch can be defined based on the virtual ID table and the forwarding state table stored in the control module. Specifically, information on the association of destination addresses with local identifiers (e.g., including forwarding engine identifiers and port identifiers) for the first switch can be retrieved from entries of the virtual ID table and the forwarding state table, and then used to generate the forwarding table for the first switch. As a result, the forwarding table for the first switch can include an address of each device coupled to the logical entity and a local identifier of the first switch that is associated with the device.

In the example of FIGS. 1 and 5-9, forwarding table 700 can be defined for switch 110 based on virtual ID table 500 and forwarding state table 600 at control module 180. Specifically, each entry of forwarding table 700 includes a MAC address of a device and a local identifier of switch 110 associated with the device. The device is a device (i.e., device A-L) coupled to a switch (i.e., switch 110, 120, 130) within the logical entity 100, and the local identifier (e.g., 0/0, 7/2, etc.) of switch 110 includes a forwarding engine identifier and a port identifier.

At 1106, a forwarding table for the second switch that associates destination addresses with identifiers local to the second switch can be defined at the control module. Similar to the forwarding table for the first switch, the forwarding table for the second switch can be defined based on the virtual ID table and the forwarding state table stored in the control module. Specifically, information on the association of destination addresses with local identifiers for the second switch can be retrieved from entries of the virtual ID table and the forwarding state table, and then used to generate the forwarding table for the second switch. As a result, the forwarding table for the second switch can include an address of each device coupled to the logical entity and a local identifier of the second switch that is associated with the device.

In the example of FIGS. 1 and 5-9, similar to forwarding table 700 defined for switch 110, forwarding table 800 can be defined for switch 120 based on virtual ID table 500 and forwarding state table 600 at control module 180. Specifically, each entry of forwarding table 800 includes a MAC address of a device and a local identifier of switch 120 associated with the device. The device is a device coupled to a switch within the logical entity 100, and the local identifier of switch 120 includes a forwarding engine identifier and a port identifier.

At 1108, the forwarding table for the first switch can be sent from the control module to the first switch. As a result, the forwarding table for the first switch can be implemented at the first switch, such that a data packet received at the first switch can be forwarded to a device or another switch coupled to the first switch according to the forwarding table for the first switch. In the example of FIGS. 1 and 5-9, forwarding table 700 defined for switch 110 can be sent from control module 180 to switch 110. Thus, forwarding table 700 can be implemented at switch 110, such that a data packet received at switch 110 can be forwarded to a device (e.g., device A, B, C) or switch 120 via a port of switch 110 (e.g., port A, B, C, D), according to forwarding table 700.

At 1110, the forwarding table for the second switch can be sent from the control module to the second switch. Similar to the forwarding table for the first switch, the forwarding table for the second switch can be implemented at the second switch, such that a data packet received at the second switch can be forwarded to a device or another switch coupled to the second switch according to the forwarding table for the second switch. In the example of FIGS. 1 and 5-9, forwarding table 800 defined for switch 120 can be sent from control module 180 to switch 120. Thus, forwarding table 800 can be implemented at switch 120, such that a data packet received at switch 120 can be forwarded to a device (e.g., device D, E) or another switch (e.g., switch 110, switch 130) via a port of switch 120 (e.g., port E, F, G, H), according to forwarding table 800.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

While shown and described above with respect to FIG. 1 as logic entity 100 including three switches 110, 120 and 130, in other embodiments, a logical entity can include any number of switches. For example, a logical entity can include less or more than three switches, each of which is operatively coupled to and controlled by a control module of the logical entity. Furthermore, the switches included in a single logical entity can be connected with each other in any form to collectively define the single logical entity.

While shown and described above with respect to FIG. 2 as switch 200 having 16 line cards and each line card containing 4 forwarding engines, in some other embodiments, a switch can have any number of line cards and a line card can include any number of forwarding engines. Similarly, while shown and described above with respect to FIG. 2 and FIG. 4 as a forwarding engine including 3 egress ports, in some other embodiments, a forwarding engine can have any number of egress ports. For example, a switch can have 20 line cards and each line card can include 3 forwarding engines, each of which contains 2 egress ports. Furthermore, each forwarding engine within a single switch can be internally connected to each remaining forwarding engine within the same switch. Thus, a data packet received at a port of a forwarding engine within the switch can be transmitted to any remaining forwarding engine of the same switch, and then sent out of the switch via a port of the remaining forwarding engine.

What is claimed is:

1. An apparatus, comprising:
a first switch having an egress port, the egress port configured to be directly connected to a second switch to collectively define a single logical entity having a plurality of virtual identifiers, a first set of virtual identifiers from the plurality of virtual identifiers being associated with the first switch, a second set of virtual identifiers from the plurality of virtual identifiers being associated with the second switch,
the first switch configured to receive a forwarding state table associating a first plurality of destination addresses with a plurality of identifiers local to the first switch and associating a second plurality of destination addresses with a plurality of identifiers local to the second switch, each identifier from the plurality of identifiers local to the first switch being uniquely associated with a virtual identifier from the first set of virtual identifiers, each identifier from the plurality of identifiers local to the second switch being uniquely associated with a virtual identifier from the second set of virtual identifiers, at least one destination address from the first plurality of destination addresses is an address of a device that is directly connected to the first switch and not a switch, at least one destination address from the second plurality of destination addresses is an address of a device that is directly connected to the second switch and not a switch.

2. The apparatus of claim 1, wherein:
the first switch is configured to receive a packet having a destination address associated with a device operatively coupled to the second switch,
the first switch is configured to forward the packet to the second switch via the egress port based on the destination address being from the second plurality of destination addresses.

3. The apparatus of claim 1, wherein:
the egress port is a first egress port,
the first switch is configured to receive a packet having a destination address associated with a device operatively coupled to a second egress port of the first switch,
the first switch is configured to send the packet to the device via the second egress port based on the destination address being associated, within the forwarding state table, with an identifier from the plurality of identifiers local to the first switch, the identifier being associated with the second egress port.

4. The apparatus of claim 1, wherein:
the first switch is configured to be directly connected to a third switch such that the first switch, the second switch and the third switch collectively define the single logical entity having the plurality of virtual identifiers.

5. The apparatus of claim 1, wherein:
the first switch is configured to be directly connected to a third switch such that the first switch, the second switch and the third switch collectively define the single logical entity having the plurality of virtual identifiers,
a third set of virtual identifiers from the plurality of virtual identifiers is associated with the third switch, each identifier from a plurality of identifiers local to the third switch is uniquely associated with a virtual identifier, from the third set of virtual identifiers.

6. The apparatus of claim 1, wherein:
the first switch is configured to be directly connected to a third switch such that the first switch, the second switch and the third switch collectively define the single logical entity having the plurality of virtual identifiers,
a third set of virtual identifiers from the plurality of virtual identifiers is associated with the third switch, each identifier from a plurality of identifiers local to the third switch is uniquely associated with a virtual identifier from the third set of virtual identifiers,
the first switch is configured to receive a packet having a destination address associated with a device operatively coupled to the third switch,
the first switch is configured to forward the packet to the third switch based on the destination address being associated, within the forwarding state table, with an identifier from the plurality of identifiers local to the third switch.

7. The apparatus of claim 1, wherein the first switch is configured to receive the forwarding state table from a control module defining the forwarding state table based on a table that (1) uniquely associates each virtual identifier from the first set of virtual identifiers with an identifier from the plurality of identifiers local to the first switch, and (2) uniquely associates each virtual identifier from the second set of virtual identifiers with an identifier from the plurality of identifiers local to the second switch.

8. The apparatus of claim 1, wherein:
each virtual identifier from the plurality of virtual identifiers differs from the remaining virtual identifiers from the plurality of virtual identifiers,
each identifier from the plurality of identifiers local to the first switch differs from the remaining identifiers from the plurality of identifiers local to the first switch,
each identifier from the plurality of identifiers local to the second switch differs from the remaining identifiers from the plurality of identifiers local to the second switch,
at least one identifier from the plurality of identifiers local to the first switch corresponding to at least one identifier from the plurality of identifiers local to the second switch.

9. An apparatus, comprising:
a control module implemented in at least one of a memory or a processing device, the control module configured to be operatively coupled to a first switch and a second switch that collectively define a single logical entity having a plurality of virtual identifiers, a first set of virtual identifiers from the plurality of virtual identifiers being associated with the first switch, a second set of virtual identifiers from the plurality of virtual identifiers being associated with the second switch, the control module configured to send to the first switch a forwarding state table associating a first plurality of destination addresses with a plurality of identifiers local to the first switch, each identifier from the plurality of identifiers local to the first switch being uniquely associated with a virtual identifier from the first set of virtual identifiers, the forwarding state table associating a second plurality of destination addresses with a plurality of identifiers local to the second switch, each identifier from the plurality of identifiers local to the second switch being uniquely associated with a virtual identifier from the second set of virtual identifiers, each virtual identifier from the first set of virtual identifiers and the second set of virtual identifiers being different from each destination address from the first plurality of destination addresses and the second plurality of destination addresses.

10. The apparatus of claim 9, wherein the control module is configured to send to the first switch the forwarding state table such that the first switch forwards a packet to an egress port of the first switch directly connected to the second switch when a destination address of the packet is associated, within the forwarding state table, with an identifier from the plurality of identifiers local to the second switch.

11. The apparatus of claim 9, wherein:
the control module is configured to send to the second switch the forwarding state table.

12. The apparatus of claim 9, wherein:
the control module is configured to send to the second switch the forwarding state table,
the control module is configured to send the forwarding state table to the first switch such that the first switch forwards a packet to an egress port of the first switch directly connected to the second switch and the second switch forwards the packet to a port of the second switch when the destination address is associated, within the forwarding state table, with an identifier from the plurality of identifiers local to the second switch.

13. The apparatus of claim 9, wherein at least one destination address from the first plurality of destination addresses is an address of a device that is directly connected to the first switch and not a switch, at least one destination address from the second plurality of destination addresses is an address of a device that is directly connected to the second switch and not a switch.

14. The apparatus of claim 9, wherein:
the control module is configured to be operatively coupled to a third switch such that the first switch, the second switch and the third switch collectively define the single logical entity having the plurality of virtual identifiers,
a third set of virtual identifiers from the plurality of virtual identifiers is associated with the third switch, each virtual identifier from the third set of virtual identifiers being uniquely associated with an identifier from a plurality of identifiers local to the third switch.

15. The apparatus of claim 9, wherein the control module is configured to define the forwarding state table based on a table (1) uniquely associating each virtual identifier from the first set of virtual identifiers with an identifier from the plurality of identifiers local to the first switch, and (2) uniquely associating each virtual identifier from the second set of virtual identifiers with an identifier from the plurality of identifiers local to the second switch.

16. The apparatus of claim 9, wherein:
each virtual identifier from the plurality of virtual identifiers differs from the remaining virtual identifiers from the plurality of virtual identifiers,
each identifier from the plurality of identifiers local to the first switch differs from the remaining identifiers from the plurality of identifiers local to the first switch,
each identifier from the plurality of identifiers local to the second switch differs from the remaining identifiers from the plurality of identifiers local to the second switch,
at least one identifier from the plurality of identifiers local to the first switch corresponding to at least one identifier from the plurality of identifiers local to the second switch.

17. An apparatus, comprising:
a first switch having a plurality of ports including a first port and a second port, the first switch configured to be directly connected to a second switch via the second port to collectively define a single logical entity, the first switch configured to store a unique association between each destination address from a plurality of destination addresses and a local identifier from a plurality of local identifiers, at least one destination address from the plurality of destination addresses is an address of a device that is directly connected to the first switch and not a switch, at least one destination address from the plurality of destination addresses is an address of a device that is directly connected to the second switch and not a switch, the first switch not storing a local identifier for the second switch,
the first switch configured to receive at the first port a packet having a destination address, the first switch configured to identify a local identifier from the plurality of local identifiers based on the destination address, the first switch configured to forward the packet to the second port based on the local identifier when the destination address is not associated with a device coupled to a port of the first switch.

18. The apparatus of claim 17, wherein the first switch is configured to forward the packet to the second switch via the second port such that the second switch forwards the packet to a third switch if the destination address is not associated with a device coupled to a port of the second switch.

19. The apparatus of claim 17, wherein the first switch is configured to receive a forwarding table from a control module, the forwarding table including the unique association between each destination address from the plurality of destination addresses and a local identifier from the plurality of local identifiers, the forwarding table not including a local identifier for the second switch.

20. The apparatus of claim 17, wherein:
the plurality of local identifiers being a plurality of local identifiers for the first switch, each local identifier from the plurality of local identifiers for the first switch differs from the remaining local identifiers from the plurality of local identifiers for the first switch,
each local identifier from a plurality of local identifiers for the second switch differs from the remaining local identifiers from the plurality of local identifiers for the second switch,
at least one local identifier from the plurality of local identifiers for the first switch corresponding to at least one local identifier from the plurality of local identifiers for the second switch.

* * * * *